Figure 1:
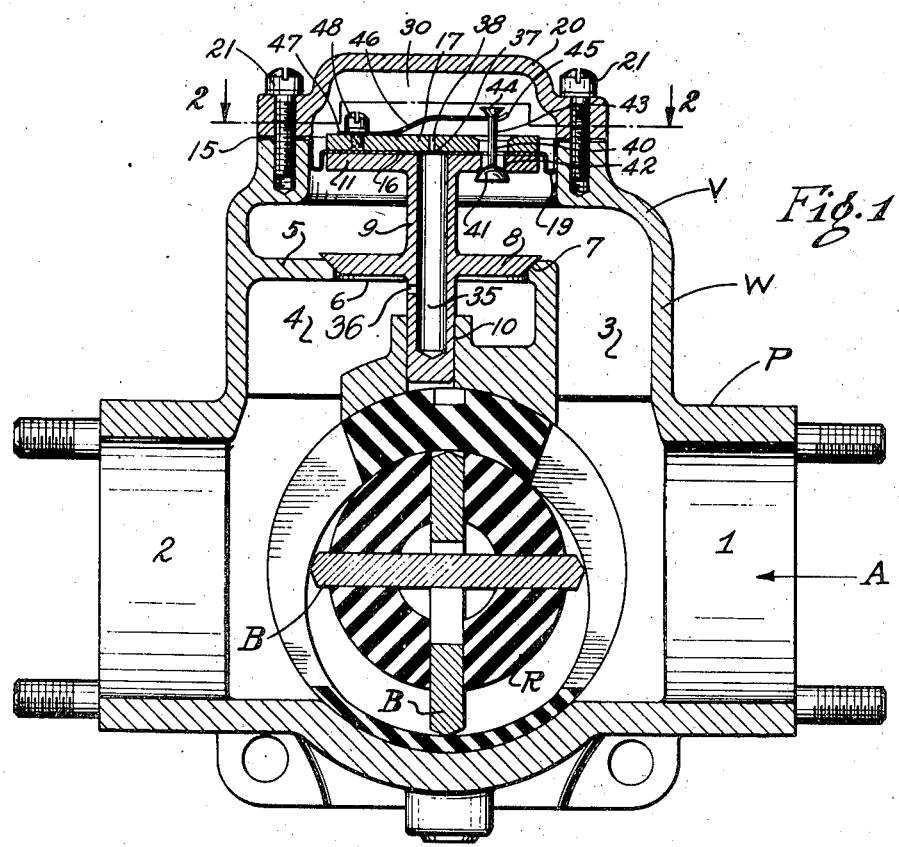

Feb. 17, 1948.    L. L. ASPELIN    2,436,242
VALVE
Filed Jan. 11, 1944

INVENTOR.
LESLIE L. ASPELIN
BY
ATTORNEYS

Patented Feb. 17, 1948

2,436,242

UNITED STATES PATENT OFFICE 2,436,242

VALVE

Leslie L. Aspelin, Elyria, Ohio, assignor to Romec Pump Company, Elyria, Ohio, a corporation of Ohio Application January 11, 1944, Serial No. 517,776

5 Claims. (Cl. 137—53)

This invention relates to relief or pressure regulating valves and is illustrated and described herein in the environment of association with a pump in which the operation and effect of the valve is shown in connection with the maintenance of a desired pressure differential between the intake and exhaust sides of the pump.

A frequent and illustrative use of the type of valve to which my invention is directed is that of permitting the whole capacity of a fluid pump to be recirculated from the outlet to inlet side of the pump directly upon the shutting off of the ultimate outflow from the pump. This is frequently the requirement in a fuel transfer pump where the ultimate outflow of the pump is controlled by a hand valve at the end of the hose or line remote from the pump. A requirement for satisfactory operation of such a valve and pump is that when the hand valve is shut off no excessive pressures or surges be built up in the fuel line and no excessive burdens be placed upon the pump or the motor or other instrumentality driving the pump, and that sufficient pressure be maintained in the system to facilitate a prompt and adequate delivery immediately upon the demand therefor as when the hand valve at the remote end of the fuel line is opened. Within such general illustrative requirements it is also desirable that the valve be rapid in its responses, sensitive to departures from the desired differential sought to be maintained, small in bulk in relation to its fluid capacity and substantially constant in its effect through a wide range of loads and pressures. One of the difficulties frequently attendant upon the accomplishment of the desired results and requirements above mentioned is associated with the spring or springs which ordinarily tend to hold the valve in closed position and in which resistance "builds up" increasingly as the valve is opened. If such springs are relatively small they tend to build up rapidly with the result that the desired differential pressure increases rapidly as the flow from the pump is throttled. On the other hand, if such springs are made big enough or long enough to reduce the rate of build-up, the bulk and cost of the apparatus becomes abnormally large. In all events such springs, that is those which act directly on the valve closure member, must be moved at least as much as movement of the closure member and be thus subjected to great fatigue and liability to breakage.

It is therefore among the objects of my invention to provide a relief or regulating valve capable of or adapted to association with a pump which will meet the requirements and obviate the difficulties attendant upon the prior art constructions above mentioned. Other objects include the provision of a relief valve in which fluid pressures available in and adjacent to the valve are used and controlled in a manner to do useful work in connection with the operation of the valve. Another object is to control the movement of the relief valve by a very light and sensitive spring the flexing movement of which is very much less than the movement of the valve closure member and which is free from the undesirable effects of build-up in relation to valve movement. Another object is to provide a relief valve of great compactness in relation to its fluid capacity and range of control, which is light in weight, simple in construction, economical as to cost of manufacture and rugged and dependable in operation. Another object is to provide a valve that automatically permits by-passing of fluid therethrough when the ordinary pressures are reversed. Other objects and advantages will appear from the following description of a preferred form and embodiment of my invention which I have illustrated in the environment of association with a pump, reference being had to the accompanying drawings in which Fig. 1 is a vertical sectional view in the plane of the axis of the valve and transversely of the rotor and bore of an illustrative pump, Fig. 2 is a horizontal sectional view taken along the lines 2—2 of Fig. 1.

Figure 2:
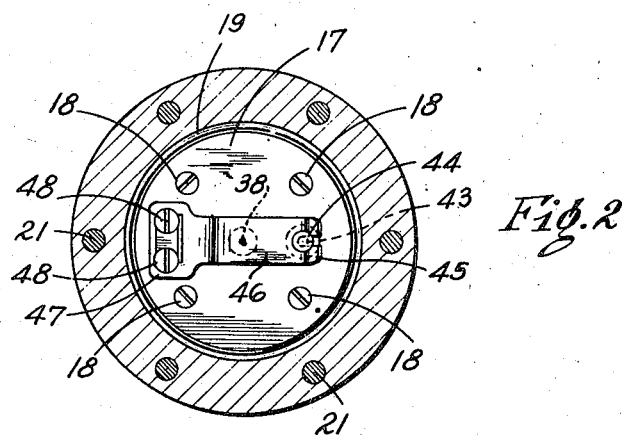

In Fig. 1 the valve V is shown in association with a pump P; the common integral wall W comprising in part the body of the valve as well as the body of the pump in the form shown. The pump P has an inlet 1 through which fluid is drawn as shown in the direction of the arrow A by the action of the rotor R and blades B which may take any well known form to induce the outflow of fluid through the discharge port 2. The chamber 3 is common to the intake side of the pump and the outlet side of the valve and may be regarded as the low pressure chamber of the valve. The chamber 4 which is common to the outlet side of the pump and the inlet side of the valve may be taken as the high pressure chamber of the valve. Integral or acting integrally with the body of the relief valve V is an internal partition 5 having a port 6 providing an annular valve seat 7 which is closed by the valve closure member or disc 8 in its lower-most position as shown in Fig. 1. The valve disc 8 is preferably formed integrally with a valve stem and guide member 9, the lower end of which is preferably slidably movable and guided in a cylindrical guide well and dash pot 10, the bottom of which may be closed as by a pump liner as shown. Preferably formed integrally with the upper end of the valve stem 9 is a diaphragm engaging plate 11 over which lies a flexible diaphragm 15, the annular marginal edge of which is preferably secured between the upper annular surface of the wall of the pump body and the lower annular face of a removable cap 20 which may be secured to the body by appropriate means such as the cap screws 21 as shown. The diaphragm 15 is secured throughout its middle annular area 16 in fluid tight relation to the plate 11 by a complementary removable disc or plate 17 which is secured tightly in relation to plate or disc 11 by a plurality of screws 18, see Fig. 2. A free flexible annular portion 19 of the diaphragm preferably taking the form of an annular fold as shown, permits up and down movement of the valve with the discs 17 and 18 under the influence of the net fluid pressure in the chambers 3 and 4 and chamber 30 above the diaphragm 15 within the cap 20.

As shown in Fig. 1 the valve stem 9 has an internal passageway 35 communicating with the chamber 4 through the side port 36 below the valve disc 8. At the upper end of the passage 35 the diaphragm 15 is ported as at 37 and the upper disc 17 is ported as at 38 so that fluid may flow from the chamber 4 through the valve stem to the chamber 30 at a rate controlled in the first instance by the resistance to such flow as offered by the orifices 36, 37 and 38. In the absence of flow through the passage 35 the whole of the pressure of the chamber 4 will be reflected in the chamber 30 and hence on the upper side of the diaphragm 15. Whenever fluid tends to flow through the passage 35 of the stem 9 its flow will be restricted especially by the resistance of the orifice 38 in the plate 17 assuming, of course, that this orifice is substantially smaller than the port 36 and the passage 35. I prefer that the orifice 38 be the controlling restriction to flow from the chamber 4 to the chamber 30 so that by substitution of different plates 17 having different size orifices a selected range of effects following from the restriction of the selected orifice 38 may be obtained by substitution of plates 17 with suitable selected and calibrated orifices 38 as desired.

Flow from the chamber 30 to the low pressure chamber 3 is permitted and controlled by a small auxiliary or pilot valve 40, the enlarged head 41 of which in its uppermost position closes the port 42 in the upper valve disc 11 of the main valve. The diaphragm 15 and the upper plate 17 are ported coextensively with the port 42 to permit the flow of fluid from the chamber 30 to the chamber 3 under the influence and control of the valve 40. The stem 43 of the valve 40 extends through these aligned ports and into the chamber 30 where its enlarged cap 44, see also Fig. 2, overlies the bifurcated upturned end 45 of the leaf spring 46 which is carried by the upper plate 17, having its end 47, opposite the bifurcated end 45, securely attached to the disc 17 as by a pair of screws 48. In the position of the parts shown particularly in Fig. 1, the spring is stressed and exerts a lifting force on the valve 40 which holds the valve 40 in its closed position until the pressure in the chamber 30 which is reflected on the exposed area of the head 41 within the port 42 is sufficient to cause the spring 46 to yield to permit the outflow of fluid from the chamber 30 as against the pressure exerted on the head 41 from the chamber 3. As shown in Figs. 1 and 2 the bifurcated end of the spring 46 is upturned and the enlarged cap 44 of the stem 43 is retained in its desired working position by the resilient upward effort of the spring while permitting a limited freedom of movement between the valve and the spring to facilitate the seating of the valve in the lower end of the port 42. Since the area of the port 42 is small, preferably following substantially the proportions indicated in the drawings, the work of the spring 46 is relatively light in its opposition to the pressure in the chamber 30. It will be observed, however, that the area of the port 42 is substantially greater than the area of the orifice 38 whereby a relatively small movement of the valve 40 will suffice to open the valve 40 enough to permit a greater outflow from the chamber 30 through the port 42 than the inflow into the chamber 30 through the orifice 38. In practice the spring 46 is selected and calibrated, and may also be appropriately shimmed between its end 47 and the top face of the disc 17, to exert a resilient lifting force on the valve 40 to prevent outflow from the chamber 30 up to the point when the desired differential in pressure exists between the chambers 30 and 3. When that differential pressure reaches the desired amount the valve 40 will yieldingly open to permit the flow of fluid from the chamber 30 to the chamber 3, closing again or restricting the flow from the chamber 30 to the chamber 3 while maintaining the pressure differential between those chambers substantially constant. It will be appreciated that the work and flexing of the spring 46 need be but very small to cause relatively great changes in the outflow from the chamber 30 in respect to the restricted inflow or potential inflow through the restricted orifice 38.

In considering the operation of the device it will be observed as I have illustrated particularly in Fig. 1 that the effective exposed area of the diaphragm 15 is somewhat greater than the effective area of the port 6 and the main valve disc 8. When the valve 40 is closed and the pressure of the chamber 4 exceeds the pressure in the chamber 3 and pressure in the chamber 30 equals the pressure in the chamber 4, the net resulting force is downward as viewed in Fig. 1, urging the main valve disc 8 on to the seat 7 and preventing flow from the chamber 4 to the chamber 3. Positive pressure in the chamber 3 acts upwardly on the effective area of the diaphragm 15 and downwardly on the main valve disc 8. To illustrate the operation of the valve as a relief and/or pressure regulating device, we may assume that the effective area of the disc 8 is unity, the effective area of the diaphragm 1.25 times unity and the effective area of the pilot valve 0.015 times unity, all substantially at the scale of the drawings. Then if it be desired to maintain a discharge pressure in the chamber 4 at 50 pounds per square inch with an intake pressure in the chamber 3 at minus 5 pounds per square inch, it will be found that a differential pressure of 44 pounds per square inch across the diaphragm acting downwardly will just balance the tendency of the pressure in the chamber 4 to open the main valve. Thus a pressure of 44 minus 5 i. e. 39 #/sq. in. must be maintained to just hold the valve closed. Since the area of the pilot valve is 0.015, the spring 46 must exert approximately 0.66 pound to hold the pilot valve 40 closed, and must yield at the next increment of increase of pressure in the chamber 4 whereby to begin to bleed the chamber 30 and thereby crack the main valve to relieve the increase in pressure in the chamber 4. Conversely as the pressure in the chamber 4 returns down to the desired 50#/sq. in. the pressure in the chamber 30 will correspondingly fall to 39#/sq. in., permitting the pilot valve to close and closing the main valve against the desired 50 pound pressure in the chamber 4. So long as the pressure in the chamber 4 remains below 50 pounds whilst the intake pressure remains at —5 pounds, the main valve will stay closed. So long as the differential pressure across the pilot valve is less than 44 pounds the pilot valve will stay closed. In the instant example this will maintain a 55 pound differential across the main valve disc 8 so long as the pump outlet pressure in the chamber 4 tends to exceed the pressure in the chamber 3 by at least 55 pounds. If the pump intake pressure should exceed the pump outlet pressure, i. e. if the pressure in the chamber 3 should exceed the pressure in the chamber 4 the main valve would be lifted since the pressure in the chamber 30 would tend to equal the pressure in the chamber 4 and the pilot valve 40 would stay closed as a check valve.

Movements of the main valve are cushioned because of the dash-pot effect in the well 10 and because movement of the main valve always requires a corresponding net displacement of fluid to or from the chamber 30 through either or both the orifice 38 and/or the pilot valve 40. However, the valve tends to have quick opening effect while resisting any tendency to slam onto the main seat 7 because when the pilot valve first relieves pressure from the chamber 30 and the diaphragm rises and reduces the volume of this chamber, that movement tends to maintain the increased pressure and hold the valve 40 open to permit or induce further movement. In this way a surge in the chamber 4 is quickly relieved. A sharp drop off in such a surge does not slam the valve shut to the injury of the seat 7 because the rate of closing of the valve is limited by the rate at which fluid can enter the chamber 30 through the orifice 38. Coacting in these effects it may be noted that the pressure drop ordinarily found across the orifice 38 is generally and preferably much less than the pressure drop across the pilot valve 40.

While I have illustrated and described a preferred form of my invention, modifications, changes and improvements will occur to those skilled in the art without departing from the precepts or principles thereof and I do not care to be limited in the scope of my patent to the preferred form or the details thereof or in any manner other than by the claims appended hereto.

I claim:

1. In a relief valve the combination of a movable valve closure member having hollow stem and a port closing disc and a diaphragm engaging plate axially spaced along said stem, a diaphragm secured to said plate, said plate having apertures therethrough one of which coincides with said hollow stem and the other of which is radially spaced therefrom, a second plate overlying said diaphragm and secured to said first plate and having apertures aligned with said first named apertures, one pair of said aligned apertures being aligned with said stem and comprising a restricted orifice, a valve disposed in the others of said aligned apertures and a leaf spring secured diametrically opposite said last named apertures and carried by and disposed generally parallel with said second named plate for actuating said valve for controlling the flow of fluid through said last named apertures.

2. A valve comprising a high pressure chamber, a low pressure chamber, an intermediate pressure chamber, a ported partition having a valve seat separating said first two chambers, movable fluid impervious means separating said intermediate pressure chamber from said low pressure chamber, a valve closure member having a stem and a disc coacting with said seat and movable to control the flow of fluid through said ported partition, said member being connected with said means through said stem and movable therewith, said member, stem and means having a restricted fluid passageway leading directly from said high pressure chamber to said intermediate pressure chamber, said means having a separate passageway leading from said intermediate pressure chamber directly to said low pressure chamber, and means carried by said first named means and responsive to the difference in pressure between said intermediate and said low pressure chambers for controlling the flow of fluid through said last named passageway.

3. A valve comprising a high pressure chamber, a low pressure chamber, an intermediate pressure chamber, a ported partition having a valve seat separating said first two chambers, movable fluid impervious means separating said intermediate pressure chamber from said low pressure chamber, a valve closure member having a stem and a disc coacting with said seat and movable to control the flow of fluid through said ported partition, said member being associated with said means through said stem and movable therewith, said member, stem and means having a fluid passageway leading from said high pressure chamber to said intermediate pressure chamber, a restricted orifice controlling the flow of fluid through said passageway, said means having a separate passageway from said intermediate pressure to said low pressure chamber and means including a leaf spring carried by said first named means and responsive to the difference in pressure between said intermediate and said low pressure chambers for controlling the flow of fluid through said last named passageway, and with said orifice controlling the flow from said high pressure chamber to said low pressure chamber.

4. A valve comprising a high pressure chamber, a low pressure chamber, an intermediate pressure chamber, a ported partition having a valve seat separating said first two chambers, movable fluid impervious means including a disc-like part separating said intermediate pressure chamber from said low pressure chamber, a valve closure member having a disc coacting with said seat and movable to control the flow of fluid through said ported partition, a hollow valve stem integrally joining said part and said member, said member, stem and means having a fluid passageway leading from said high pressure chamber directly to said intermediate pressure chamber, a restricted orifice controlling the flow of fluid through said passageway, said means having a net effective pressure area greater than said disc and having a separate passageway from said intermediate pressure chamber directly to said low pressure chamber, and means carried by said first named means and responsive to the difference in pressure between said intermediate and said low pressure chambers for controlling the flow of fluid through said last named passageway, the flow of fluid through said passageways being substantially continuous and continuously varying to maintain a desired difference between the pressures in said high pressure chamber and said low pressure chamber when the disc is in open position and the pressure in the high pressure chamber exceeds the pressure in the low pressure chamber.

5. In a valve, a high pressure chamber, a low pressure chamber, an intermediate pressure chamber with a movable fluid impervious member separating the last two mentioned chambers and responsive to the pressure differential therebetween and a partition having a port with a valve seat separating said first two mentioned chambers, a valve closure member comprising a hollow stem coacting and movable with said fluid impervious member and a disc carried by said stem coacting with said seat to control the flow of fluid through said port in response to movement of said fluid impervious member, said hollow stem extending beyond said disc on the high pressure side thereof and being open to said high pressure chamber and affording communication between said high pressure chamber and said intermediate pressure chamber, an aperture leading directly between said intermediate pressure chamber and said low pressure chamber, an orifice restricting the flow of fluid through said hollow stem, guide means in said high pressure chamber receiving said stem in axial alignment with said seat, and a pilot valve carried by said fluid impervious member in said aperture responsive to the pressure differential between said intermediate pressure chamber and said low pressure chamber and controlling the flow of fluid therebetween, the flow through said orifice and said aperture being substantially continuous so long as the pressure differential between the said high pressure chamber and said low pressure chamber exceeds a predetermined amount.

LESLIE L. ASPELIN.

REFERENCES CITED

The following references are of record in the file of this patent:

UNITED STATES PATENTS

| Number | Name | Date |
|---|---|---|
| 534,514 | Mellin | Feb. 19, 1895 |
| 1,379,092 | Graccascia et al. | May 24, 1921 |
| 1,863,454 | Rowley | June 14, 1932 |
| 2,114,760 | Briggs | Apr. 19, 1938 |

FOREIGN PATENTS

| Number | Country | Date |
|---|---|---|
| 619,368 | Germany | Sept. 28, 1935 |